(12) United States Patent
Marley et al.

(10) Patent No.: US 7,139,556 B2
(45) Date of Patent: Nov. 21, 2006

(54) PROVISION OF LOCATION DEPENDENT SERVICES WITHOUT REVEALING THE USER IDENTITY VIA A MOBILE TELECOMMUNICATIONS NETWORK

(75) Inventors: Neil Marley, Winchester (GB); Charlie William Debney, Kintbury (GB)

(73) Assignee: Vodafone Group PLC., Berkshire (GB)

( * ) Notice: Subject to any disclaimer, the term of this patent is extended or adjusted under 35 U.S.C. 154(b) by 199 days.

(21) Appl. No.: 10/468,044

(22) PCT Filed: Jan. 17, 2002

(86) PCT No.: PCT/GB02/00195

§ 371 (c)(1),
(2), (4) Date: Sep. 25, 2003

(87) PCT Pub. No.: WO02/065804

PCT Pub. Date: Aug. 22, 2002

(65) Prior Publication Data

US 2005/0261001 A1    Nov. 24, 2005

(30) Foreign Application Priority Data

Feb. 13, 2001   (GB)   ................................. 0103502.1

(51) Int. Cl.
*H04Q 7/22*   (2006.01)
(52) U.S. Cl. .................. 455/414.1; 455/403; 455/424
(58) Field of Classification Search ................ 455/403, 455/406, 410, 411, 414.1, 420, 422.1, 423–425, 455/426.2, 428, 433, 456.1, 404.2, 424
See application file for complete search history.

(56) References Cited

U.S. PATENT DOCUMENTS

| | | | |
|---|---|---|---|
| 5,448,760 A * | 9/1995 | Frederick | 455/410 |
| 5,488,569 A | 1/1996 | Kaplan et al. | |
| H1894 H | 10/2000 | Fletcher et al. | |
| 6,243,739 B1 * | 6/2001 | Schwartz et al. | 709/206 |
| 6,282,424 B1 * | 8/2001 | Wright et al. | 455/450 |
| 6,289,212 B1 * | 9/2001 | Stein et al. | 455/412.1 |
| 6,647,260 B1 * | 11/2003 | Dusse et al. | 455/419 |
| 6,754,482 B1 * | 6/2004 | Torabi | 455/410 |
| 2001/0014911 A1 * | 8/2001 | Doi et al. | 709/221 |

FOREIGN PATENT DOCUMENTS

| | | |
|---|---|---|
| EP | 0 301 740 | 6/1994 |
| EP | 1 081 916 | 3/2001 |
| EP | 1 126 732 | 8/2001 |
| FR | 2 711 033 | 4/1995 |
| GB | 2 287 855 | 9/1995 |
| WO | WO 99/30514 | 6/1999 |
| WO | WO 99/52316 | 10/1999 |
| WO | WO 00/72207 | 11/2000 |
| WO | WO 00/77642 | 12/2000 |
| WO | WO 01/28273 | 4/2001 |

OTHER PUBLICATIONS

Schwartz, How to be Virtually Anonymous, Web Techniques, Feb. 1997, pp. 30-33.
GSM: (Global System For Mobile Communications) Digital Cellular Telecommunications System, Version 7.0.0., 1998, no month listed.

* cited by examiner

*Primary Examiner*—CongVan Tran
(74) *Attorney, Agent, or Firm*—Leydig, Voit & Mayer, Ltd.

(57) ABSTRACT

Application service providers (ASP1, ASP2 . . . ) are linked to a mobile telecommunications network (N), such as a cellular telecommunications network, for providing services such as information-providing services to users (MS1, MS2, MS3 . . . ) in the network. For example, one service provider (ASP1) may, on request from a user, provide the address of or directions to the user's nearest pizza outlet. The user's request is intercepted by the network which generates a "user tag" identifying the user, the service provider to whom the request is directed, and the time and date of the request. The network stores the information in the user tag, encodes it and transmits it to the service provider in a form from which the service provider is unable to access the user or obtain the user's identity. The service provider then requests the current location of the user from the network using the user tag to identify the user to the network. The network transmits the user's location to the service provider in association with the user tag and the service provider responds by transmitting back to the network the information required by the user (the address of or directions to the user's nearest pizza outlet), again in association with the user tag. The network passes the information to the user. Finally, the service provider requests the network to levy a charge against the user, again using the user tag so that the network can identify the particular user. In this way, information identifying the user is never provided to the service provider who cannot therefore directly access the user either during the session or subsequently. The user tag may have a predetermined short lifetime to provide further security.

29 Claims, 2 Drawing Sheets

PROVISION OF LOCATION DEPENDENT SERVICES WITHOUT REVEALING THE USER IDENTITY VIA A MOBILE TELECOMMUNICATIONS NETWORK

CROSS REFERENCE TO RELATED APPLICATIONS

Not applicable.

BACKGROUND OF THE INVENTION

Field of the Invention

The invention relates to a method by which a service provider provides a service to a user in a mobile telecommunications network in response to a request for the service by that user, in which the network generates a request signal in response to the user request, the network transmits the request signal to the service provider, and the service provider provides the service to the user via the network and using the request signal.

The invention also relates to a mobile telecommunications network, comprising means responsive to a request by a user in the network for an informational response service to be provided by a service provider known to the network for at least temporarily storing the identity of the particular user making the request, and means for transmitting a request signal to the service provider which corresponds to the request by that particular user.

The invention further relates to a system, comprising a mobile communications network and at least one service provider capable of providing a service to a user in the network in response to a request for the service by that user, including means in the network for generating a request signal in response to the user request, means for transmitting the request signal to the service provider, means in the network for receiving information relating to the service from the service provider in association with the request signal, and means in the network responsive to the request signal to provide the information to the user.

Systems and methods according to the invention, to be described in more detail below by way of example only, enable application service providers to provide services to users in a mobile telecommunications network such as a cellular telephone network.

BRIEF SUMMARY OF THE INVENTION

According to the invention, the method as first set forth above is characterised in that the request signal includes identity information which identifies the user to the network but provides no information to the service provider which enables the service provider to directly access the user.

According to the invention, also, the network as first set forth above is characterised in that the request signal does not enable direct access by the service provider to that user, and by means for receiving the informational response from the service provider in association with the request signal for directing the informational response to the particular user.

According to the invention, further, the system as first set forth above is characterised in that the request signal includes identity information which identifies the user to the network but provides no information to the service provider which enables the service provider to directly access the user.

BRIEF DESCRIPTION OF THE DRAWINGS

Systems and methods according to the invention for providing services to users in a cellular telephone network will now be described by way of example only and with reference to the accompanying diagrammatic drawings in which.

DETAILED DESCRIPTION OF THE EMBODIMENTS OF THE INVENTION

Figure 1:
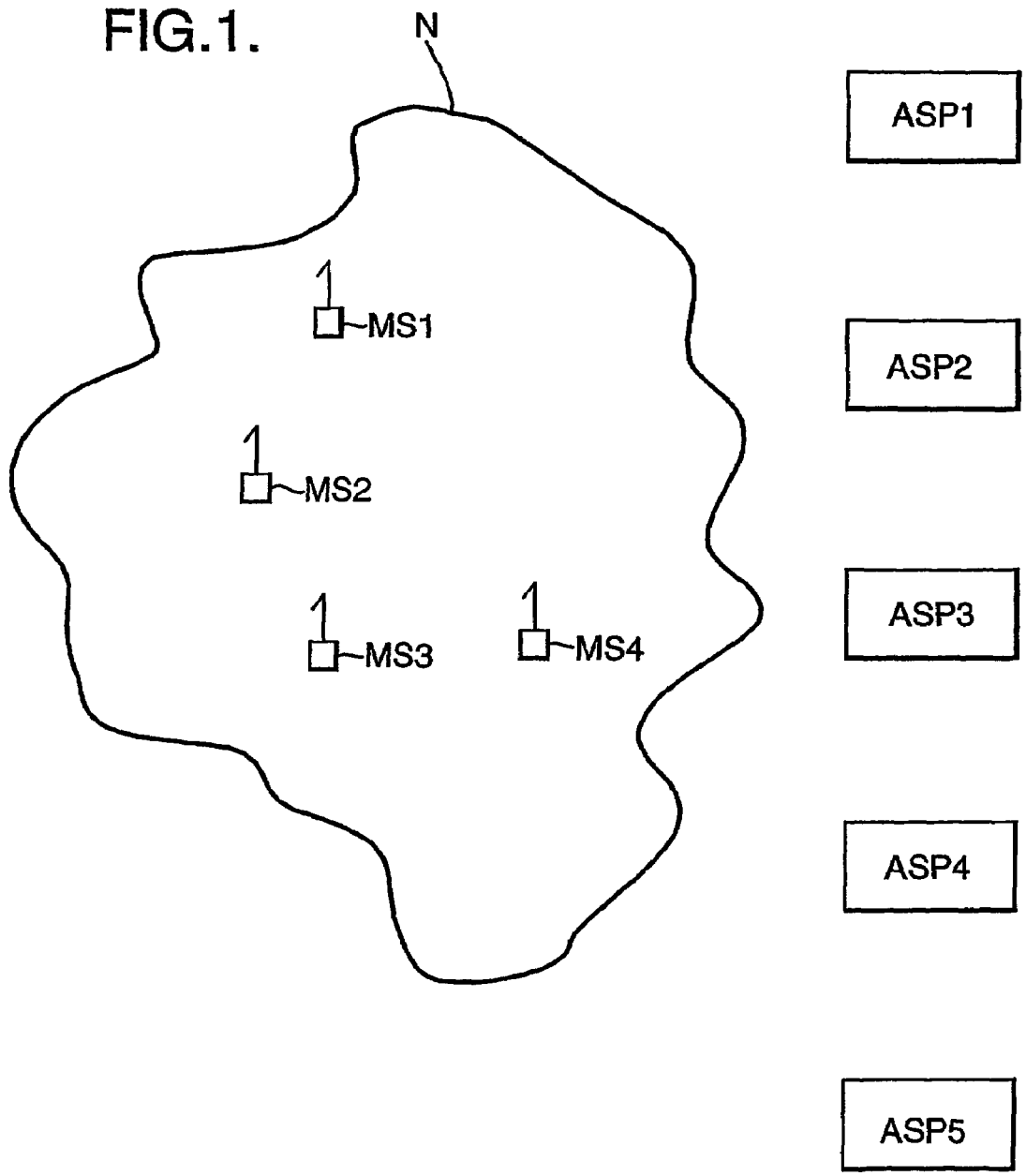
FIG. 1 shows such a network.

FIG. 1 shows a cellular telecommunications network N in which are located users having respective mobile telephone handsets or mobile stations MS1, MS2, MS3, MS4 . . . . The network N may be a GSM or 3G (Third Generation) network or similar network. FIG. 1 also shows a number of application service providers ASP1, ASP2, ASP3, ASP4, ASP5 . . . . The application service providers provide various services to users in the network N. The services offered by the ASPs may be of various types. For example, they may be of the "subscription" or "non-subscription" type. A subscription-type service might be, for example, a traffic information service to which a particular user subscribes, paying an annual or monthly subscription fee, automatically being provided with periodic or irregular information concerning road traffic conditions relevant to the location of the user's vehicle at any time. Other examples of subscription-type services are the provision of news information, sports information, financial information and weather information. Subscription-type services therefore provide services on an on-going basis to subscribing users.

A non-subscription-type service provides a single service to a user, normally on a commercial basis and for a single payment. Such a service may in particular be dependent on the user's current location. One example of such a non-subscription-type service is a service provided by (or on behalf of) a chain of fast food (e.g pizza) outlets distributed geographically over all or part of the area covered by the network N. Using this service, a user, in response to a specific real time request, can be provided by the relevant ASP (e.g. ASP1) with directions to or the address of the outlet nearest to the user's current location. For the provision of this information, ASP1 will make a (normally small) charge. The charge could be debited directly to the user. Instead, in a case where ASP1 is providing the service for the chain of pizza outlets, the charge might be debited to that chain in the form of an "introduction fee" for introducing that user to the particular outlet. Such charges may be debited by the network on behalf of the ASP.

The system and method to be described in more detail below are particularly concerned with non-subscription-type services—such as the example given above where a user in the network N wishes to ask ASP1 for directions to or the location of the nearest pizza outlet. Obviously, though, the system and method can provide other non-subscription-type services.

The system and method to be described are intended to deal with certain problems or potential problems:

(a) ASP1 needs to know the location of the user, in order to be able to accede to the user's request for directions to or the location of the nearest pizza outlet. The operator of the network N has this information—but it of course has value or potential value and the network operator will therefore not wish to disclose it freely to ASP1.

(b) If the system and method are arranged so that the user makes a telephone call direct to ASP1, the user's CLI (calling line identifier, or telephone number) will normally be disclosed to ASP1. ASP1 can then correspond directly with the user and obtain the user's location. The valuable information, concerning user's telephone number and location, as known to the network operator, will then have been directly and freely disclosed to ASP1 without recompense to the network operator (apart, of course, from the cost of the telephone call).

(c) If the user's telephone number becomes disclosed to ASP1, the ASP will be able to use this information in future to make direct calls to the user, offering the pizza service (or other services), thus detrimentally by-passing the network operator.

(d) It is of major importance that the network operator (and other parties in the system) respect data protection and privacy laws and regulations. Thus, these may be breached by unsolicited advertising calls to the user (e.g. by the ASP if the ASP gains knowledge of the user's telephone number) or by disclosure of the user's identity, or identity combined with location, of the user. Mere disclosure to the ASP of the user's location, without identifying the user in a manner enabling the ASP to make direct access to the user, will not breach such laws or regulations.

Figure 2:
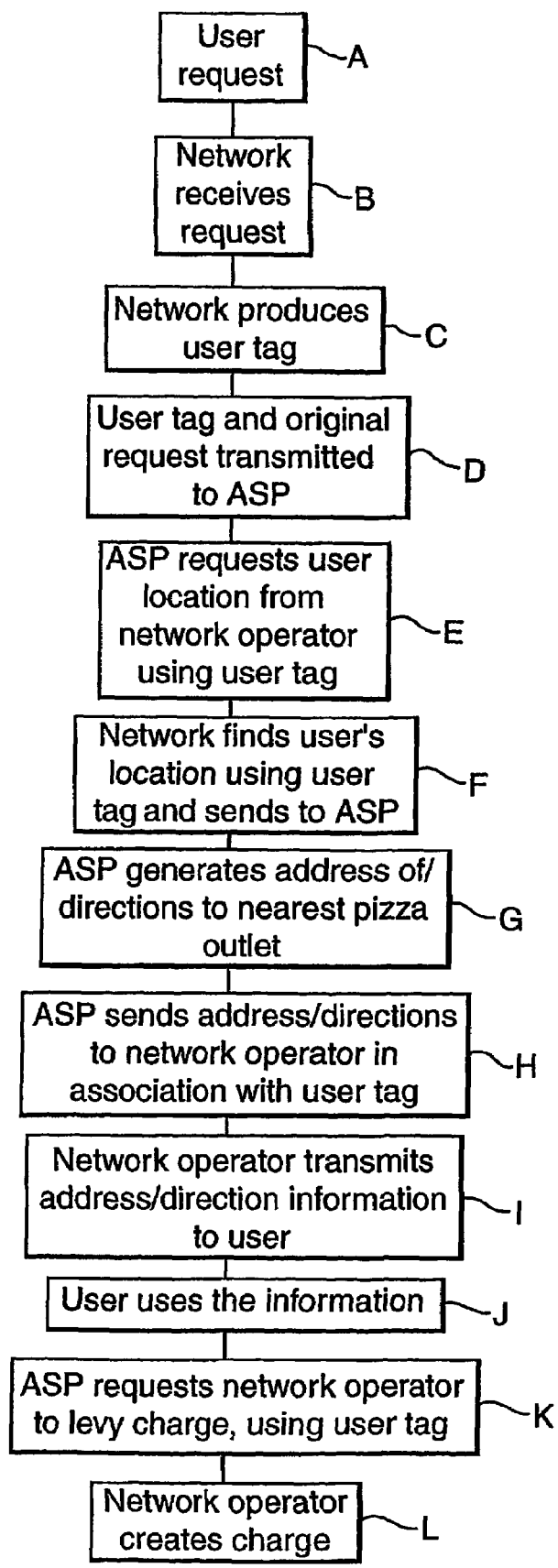
FIG. 2 is a flow chart showing operations taking place in the network.

The system and method will now be described in more detail with reference to FIG. 2 which represents a flow chart of the operations taking place.

At A, a user initiates a request to ASP1 for (in this example) the address of, or the directions to, the nearest pizza outlet. At step B, this request is received by the network N. It is not transmitted directly to ASP1 but recognised as being intended for ASP1.

At step C, the network responds to the user's request by generating a request signal or "user tag". The user tag comprises at least four components: (i) an identification of the user; (ii) an identification of the ASP which is to be involved in the transaction (ASP1 in this case); (iii) the time and date of the user's request; and (iv) information relating to the actual connection (mode, format etc.). In connection with (iv), a "session" between a user and ASP may consist of many components. There could be several layers of activity going on in one session, which all may require different billing/auditing. Hence the specifies of the connection will identify the unique aspects of the session. It is an important feature of the user tag that it is encoded or encrypted in a suitable way (discussed below in more detail) so that the information which it contains is not accessible by the ASP though it can be distinguished by the ASP from user tags relating to other user requests; thus for example, the user tag may comprise a multi-digit number or have alphanumeric or any other suitable form. The information which it contains or represents remains accessible by the network operator.

At step D, the network passes the user tag to ASP1 which recognises it as representing a request from a user for the address of or directions to the user's nearest pizza outlet. ASP1 does not of course receive any information about the user or the user's location (except that it is implicit that the user is within the area covered by the network N).

If ASP1's system is currently operative, the ASP will at step E request information about the user's location from the network N, using the user tag as a means of relating this request to the particular user.

At step F, the network responds to this request by providing the location of the user to ASP1—that is, by defining the geographical area in which the user is currently present. The network knows which user is concerned because it derives this information from the user tag. This is the only information which the network will provide; no information identifying the user or the user's telephone number is provided.

At step G, ASP1 responds to receipt of the information about the user's location by generating the requested information (the address of or directions to the nearest pizza outlet). Alternatively, it may be that there is no pizza outlet within reasonable distance of the user's location, and information to that effect will instead be generated. At step H, the ASP passes this information back to the network N. At step I, the network transmits this information to the user. Thus, ASP1 has no direct communication with the user and does not need to know the user's telephone number (or identity).

At step J the user then acts in accordance with the address/directions provided.

At step K, ASP1 then requests the network operator to levy a charge against the user, for the provision of the service. ASP1 will again use the user tag during this process so that the network operator can identify the user and levy the charge accordingly (step L). The charge can be levied by debiting the user's call charge log (if the user is a contract customer) or placing a debit against the user's pre-paid credit if the user is a pre-pay customer.

In accordance with an important feature of the user tag, it is provided with a finite lifetime appropriate to the maximum time likely to be involved in the provision of the service (e.g. 30 minutes in this case). This lifetime prevents the ASP from attempting to make further contacts with the user (via the network operator) with a view to selling further services. The provision of this finite lifetime for the user tag provides further protection for the user's privacy and for the user data stored by the network operator. Because the user tag incorporates information identifying the particular-ASP, it protects against fraudulent attempts by another ASP to make contact with the user.

The user tag can be protected in any suitable way. For example, it could be produced in the form of a random multi-digit number which is stored by the network operator in a database in association with the specific four components of the user tag. Instead, the user tag could be generated by the network operator and then encrypted using the network operator's public key in a public/private key system. Other suitable methods of coding or encrypting or otherwise protecting the information in the user tag can be used.

The user can be used to perform an auditing function. The network operator will have a complete record of the transactions and services requested and delivered. This is clearly relevant to billing but can also be used for marketing and data analysis purposes (e.g. which is the most popular ASP etc.).

It is important to note that the system described is not restricted to location-dependent services. For example, a user could order a ring tone from an ASP. The ASP provider can then deliver the ring tone directly to the user's mobile without needing to know the mobile number (by using the user tag in the manner explained). In addition, information not related to location can be delivered directly to a user using the user tag in the manner explained (e.g. share prices).

The invention claimed is:

1. A method by which a service provider provides a service to a user in a mobile telecommunications network in response to a request for the service by that user, in which the network generates a request signal in response to a user request, the network transmits the request signal to the service provider, and the service provider provides the service to the user via the network and using the request signal, the request signal including identity information which identifies the user to the network but provides no information to the service provider which enables the service provider to directly access the user, wherein the request signal includes data allowing the request signal to be distinguished by the service provider from request signals relating to other requests, and wherein the request signal is only effective for the service provider for a length of time which is dependent on a length of time for providing the service.

2. A method according to claim 1, wherein the provision of the service by the service provider requires that the service provider has location information specifying a location of the user, and in which the service provider uses the request signal to obtain that location information from the network operator.

3. A method according to claim 2, wherein the service provider transmits the request signal to the network and the network uses the request signal and the identity information therein to derive the location information and transmits that location information to the service provider in association with the request signal.

4. A method according to claim 1, wherein the service provider uses the request signal to request generation of charging information by the network for the provision of the service.

5. A method according to claim 4, wherein the network uses the request signal to identify the user in relation to which a charge is to be generated.

6. A method according to claim 1, wherein the request signal is only effective for the service provider for a predetermined length of time.

7. A method according to claim 1, wherein the request signal identifies the service provider and a time of the request to the network.

8. A method according to claim 1, wherein the request signal identifies a position in a database from which the network can extract the identity information.

9. A method according to claim 1, wherein the request signal is encrypted before receipt by the service provider.

10. A method according to claim 1, wherein the service provided by the service provider is a provision of information.

11. A mobile telecommunications network, comprising means responsive to a request by a user in the network for an informational response service to be provided by a service provider known to the network for at least temporarily storing an identity of the particular user making the request; and means for transmitting a request signal to the service provider which corresponds to the request by that particular user, which request signal does not enable direct access by the service provider to that user; and means for receiving the informational response service from the service provider in association with the request signal for directing the informational response to the particular user; wherein the request signal includes data allowing the request signal to be distinguished by the service provider from request signals relating to other requests, and wherein the request signal is only effective for the service provider for a length of time which is dependent on a length of time for providing the service.

12. A network according to claim 11, wherein the provision of the service by the service provider requires that the service provider has location information specifying a location of the user, and in which the service provider uses the request signal to obtain that location information from the network.

13. A network according to claim 12, wherein the service provider transmits the request signal to the network and the network uses the request signal and identity information therein to derive the location information and transmits that location and identity information to the service provider in association with the request signal.

14. A network according to claim 11, wherein the service provider uses the request signal to request generation of charging information by the network for the provision of the service.

15. A network according to claim 14, wherein the network uses the request signal to identify the user in relation to which a charge is to be generated.

16. A network according to claim 11, wherein the request signal is only effective for the service provider for a predetermined length of time.

17. A network according to claim 11, wherein the request signal identifies the service provider and a time of the request to the network.

18. A network according to claim 11, wherein the request signal identifies a position in a database from which the network can extract identity information.

19. A network according to claim 11, wherein the request signal is encrypted before receipt by the service provider.

20. A system, comprising a mobile communications network and at least one service provider capable of providing a service to a user in the network in response to a user request for a service by that user, including means in the network for generating a request signal in response to the user request, which request signal includes identity information which identifies the user to the network but provides no information to the service provider which enables the service provider to directly access the user; means for transmitting the request signal to the service provider; means in the network for receiving information relating to the service from the service provider in association with the request signal; and means in the network responsive to the request signal to provide the information relating to the service to the user; wherein the request signal includes data allowing it to be distinguished by the service provider from request signals relating to other requests, and in wherein the request signal is only effective for the service provider for a length of time which is dependent on a length of time for providing the service.

21. A system according to claim 20, wherein providing the service by the service provider requires that the service provider has location information specifying a location of the user, and in which the service provider uses the request signal to obtain that related location information from the network.

22. A system according to claim 21, wherein the service provider transmits the request signal to the network and the network uses the request signal and the identity information therein to derive the location information and transmits that location information to the service provider in association with the request signal.

23. A system according to claim 20, wherein the service provider uses the request signal to request generation of charging information by the network for providing the service.

24. A system according to claim 22, wherein the network uses the request signal to identify the user in relation to which a charge is to be generated.

25. A system according to claim 20, wherein the request signal is only effective for the service provider for a predetermined length of time.

26. A system according to claim 20, wherein the request signal identifies the service provider and a time of the request to the network.

27. A system according to claim 20, wherein the request signal identifies a position in a database from which the network can extract the identity information.

28. A system according to claim 20, wherein the request signal is encrypted before receipt by the service provider.

29. A method by which a service provider provides a service to a user in a mobile telecommunications network in response to a request for the service by that user, in which the network generates a request signal in response to the user request, the network transmits the request signal to the service provider, and the service provider provides the service to the user via the network and using the request signal, the request signal including identity information which identifies the user to the network but provides no information to the service provider which enables the service provider to directly access the user, wherein the request signal includes data allowing the request signal to be distinguished by the service provider from request signals relating to other requests, and wherein the request signal is only effective for the service provider for a length of time which is dependent on the a length of time for providing the service, and wherein the service provider uses the request signal to request generation of charging information by the network for the provision of the service.

* * * * *